(12) United States Patent
Hammer

(10) Patent No.: US 9,082,029 B2
(45) Date of Patent: Jul. 14, 2015

(54) OPTICAL CODE SCANNER WITH A HIGH DISPERSION OPTICAL LENS

(71) Applicant: Steven Joel Hammer, Lilburn, GA (US)

(72) Inventor: Steven Joel Hammer, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/065,955

(22) Filed: Oct. 29, 2013

(65) Prior Publication Data

US 2015/0115033 A1    Apr. 30, 2015

(51) Int. Cl.
*G06K 7/10* (2006.01)

(52) U.S. Cl.
CPC .................................. *G06K 7/10732* (2013.01)

(58) Field of Classification Search
USPC .................. 235/455, 462.06, 462.22, 462.23, 235/462.42

IPC .................. G06K 7/10851,2207/1018, 7/10722, G06K 7/10811, 7/10881, 7/10702, 7/10732

See application file for complete search history.

(56) References Cited

U.S. PATENT DOCUMENTS 8,642,962 B2 *   2/2014   Reuss ........................ 250/338.1

* cited by examiner

*Primary Examiner* — Karl D Frech
(74) *Attorney, Agent, or Firm* — Harden E. Stevens, III; Joseph P. Mehrle

(57) ABSTRACT

An optical code scanner is presented that includes image capture technology to scan optical codes. The image capture technology uses a fixed aperture, a fixed standard optical lens, a fixed high dispersion optical lens and at least one illumination device that generates different colors of light. Together, these elements increase the effective depth of field of the optical code scanner by capturing images of an item presented to the optical code scanner using different colors of light.

17 Claims, 6 Drawing Sheets

OPTICAL CODE SCANNER WITH A HIGH DISPERSION OPTICAL LENS

FIELD OF THE INVENTION

The present invention relates to optical code scanners and more specifically to optical code scanners with a high dispersion optical lens.

BACKGROUND

Optical code scanners are used to read optical codes and the information encoded therein. Optical code scanners may suitably be combined with other apparatuses or systems that use optical codes. For example, an optical code scanner can be integrated with a point of sale (POS) terminal to read optical codes on items which are presented to the POS terminal for purchase as part of a purchase transaction. Historically, optical code scanners were based on laser scanning technology where laser beams are moved through a volume of space above the optical code scanner. Laser light reflected from an object passing through the volume of space is captured and processed to detect and recover information from an optical code located on the object. Laser scanning technology has the benefits of very high scanning rates, a large depth of field and minimal lighting requirements. However, laser scanning technology is generally limited to scanning less complex optical codes, such as one-dimensional barcodes.

Image scanning technology is another type of scanning technology used by optical code scanners to scan optical codes. Image scanning technology has the benefit of being able to scan any type of optical code including both one and two dimensional barcodes. However, image scanning technology suffers from a short depth of field and generally requires high levels of illumination.

SUMMARY

Among its several aspects, the present invention seeks to overcome or ameliorate at least one of the disadvantages of the prior art, or to provide a useful alternative.

Among its several aspects, the present invention recognizes that there is an advantage to using image scanning technology to scan and decode optical codes because the technology can read a wide variety of different optical code types. The invention further recognizes that the image scanning technology of this invention has the advantage of an increased depth of field while keeping the required level of illumination at or below the levels used by conventional imaging technology. The increased depth of field allows optical codes to be read across a wider area which typically improves first pass performance or the ability to read an optical code the first time it is presented for reading.

Additionally, the invention recognizes that having optical elements that move as part of the normal operation of an optical system in the image capture technology will increase complexity and cost while also reducing the reliability of the optical system. Thus, there is an advantage to providing the increased depth of field while not moving any elements of the optical system. In other words, providing auto focusing without moving elements.

In accordance with the teachings of the present invention, an optical code scanner uses a fixed optical system that includes a fixed aperture, a standard optical lens and a high dispersion optical lens. The high dispersion optical lens maximizes a characteristic of the high dispersion lens that is minimized or corrected in the standard optical lens. This characteristic is known as chromatic aberration. Most optically transparent materials have a different refractive index for different wavelengths or colors of light which causes different colors of light to be focused to different locations. The material used in the standard optical lens has a low level of chromatic aberration and is color corrected to further reduce chromatic aberration. The result is different wavelengths of light focused to generally the same location. However, a high dispersion material, like the material used in the high dispersion optical lens, has a high level of chromatic aberration where different wavelengths of light focus over a range of locations that can be separated by inches.

Among its several aspects, the present invention recognizes there is an advantage to using image capture technology that has an increased depth of field without having to dynamically move elements of the optical system to achieve the increased depth of field. The invention recognizes that this technology further has increased reliability over image capture technologies based on moving elements of the optical system. The invention also recognizes that this technology has a lower cost to implement and control than image capture technologies based on moving elements of the optical system.

In accordance with an embodiment of the present invention, there is provided a method of operating an optical code scanner to increase the depth of field for reading optical codes without moving optical elements. The method is implemented by a digital processor located within the optical code scanner. The method comprises: causing a plurality of illumination devices to emit a first narrow band of light directed to a scanning area of the optical code scanner for a first time period; capturing an image of the scanning area during the first time period wherein the image passes through a high dispersion optical lens before being captured; causing a plurality of illumination devices to emit a second narrow band of light directed to the scanning area of the optical code scanner for a second time period wherein the second narrow band of light is at a wavelength different from the first narrow band of light; capturing an image of the scanning area during the second time period wherein the image passes through the high dispersion optical lens before being captured; and processing the captured images to decode an optical code.

In accordance with another embodiment of the present invention, there is provided a method of operating an optical code scanner that increases the depth of field for the scanner when reading optical codes without moving optical elements. The method is implemented by a digital processor located within the optical code scanner. The method comprises: generating a first narrow band of light directed to a scanning area of the optical code scanner for a first time period; capturing an image during the first time period wherein light passes through a high dispersion optical lens that correctly focuses only light reflected from a first portion of the depth of field when illuminated by light of the first narrow band of light; generating a second narrow band of light directed to the scanning area of the optical code scanner for a second time period; capturing an image during the second time period wherein light passes through a high dispersion optical lens that correctly focuses only light reflected from a second portion of the depth of field when illuminated by light of the second narrow band of light wherein the first and second portions of the depth of field do not overlap and the first narrow band of light is different from the second narrow band of light; and processing the captured images to decode an optical code.

In accordance with an embodiment of the present invention, there is provided an optical code scanner with an enhanced depth of field using fixed optical elements. The optical code scanner comprises: at least one illumination device that emits at least a first narrow band of light during a first period of time and emits a different second narrow band of light during a second period of time and where the illumination device is aligned to direct the emitted light to an optical code scanning area; an image capture device aligned to receive light reflected from the optical code scanning area; and a fixed first optical focusing lens that focuses the received reflected light to a focal point on the image capture device where the fixed optical lens focuses light from a first portion of the enhanced depth of field to the focal point during the first period of time and focuses light from a different second portion of the enhanced depth of field to the focal point during the second period of time.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
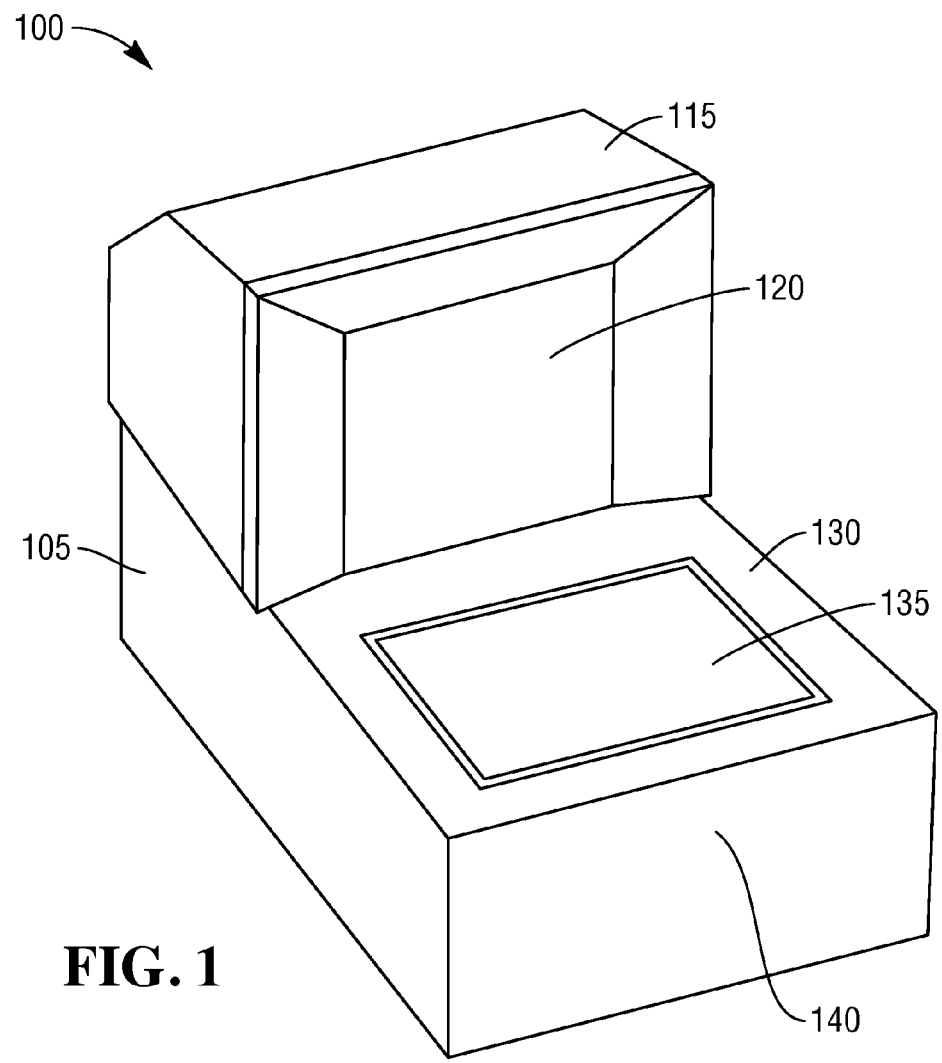
FIG. 1 is a high-level drawing illustrating an optical code scanner of the present invention.

Referring to FIG. 1, there is provided a high-level drawing illustrating an exemplar embodiment of an optical code scanner ("scanner") 100. The optical code scanner 100 reads optical codes presented to the optical code scanner 100. An optical code is a computer readable representation of information. In this embodiment, optical codes can be attached to or printed on an item or object or displayed on an electronic display such as the display screen of a cell phone or tablet computer. The optical code may suitably include one dimensional and two dimensional bar codes. The optical code scanner 100 can read optical codes based on symbologies that include but are not limited to: UPS, EAN, Code 128, GS1 DataBar™, Datamatrix, Aztec, QR and MaxiCode.

The scanner 100 is located within a housing 105. The housing 105 includes a vertical housing component 115 and a horizontal housing component 130. The scanner 100 includes a horizontal scanning window 135 and a vertical scanning window 120. The horizontal scanning window 135 is housed in the horizontal housing component 130. The vertical scanning window 120 is housed in a vertical housing component 115 of the scanner 100 and faces an operator side 140 of the scanner 100. The side of the vertical housing component 115 that houses the vertical scanning window 120 is the front of the scanner 100 and faces the operator of the scanner 100. The two scanning windows 120, 135 are composed of an optically transparent material such as hurricane glass, sapphire coated glass or the like.

An operator scans an item by orienting an optical code on an item or device so it faces either the vertical scanning window 120 or the horizontal scanning window 135 and then moving the item past the scanning windows 120, 135. The scanner 100 produces one or more indications to the operator, such as an audio sound, a light or both, once the optical code has been identified and read. The scanner 100 uses imaging technology to capture images of the optical code which are processed to decode the information stored in the optical code.

In this embodiment, the scanner 100 is illustrated using two scanning windows 120, 135. In other embodiments, a single scanning window or three or more scanning windows are used to implement the scanner 100. The scanner 100 is fixed to a location when in operation. However, a mobile or hand held scanner implementing the invention is also envisioned.

In some embodiments, the scanner 100 is part of a self-service checkout terminal where the operator would generally be a customer that is scanning items for purchase. In other embodiments, the scanner 100 is part of an assisted checkout terminal where the operator is generally an employee that is trained to operate the terminal and conduct a purchase transaction for a customer. In some embodiments, the scanner 100 is part of a terminal that can be configured to at times be a self-service checkout terminal and at other times be an assisted checkout terminal. In still other embodiments, the scanner 100 is part of a system where the scanner 100 is used to identify items that pass by the scanner 100. An operator may still scan the items or the items may be automatically moved past the scanner 100 on a conveyor belt or the like. Examples of these types of systems include but are not limited to: inventory management systems, item routing systems, item sorting systems, mail or package sorting systems and the like.

In some embodiments, the scanner 100 may suitably include additional laser scanning technology that uses one or more lasers to scan and read an optical code. The laser beams from the laser are directed to form scanning patterns through the vertical scanning window 120 and the horizontal scanning window 135. When a directed laser beam strikes and moves across an object presented to the scanner 100 for scanning, the object reflects a portion of the laser light. Some of the reflected laser light passes back through one of the scanning windows (120 or 135) and is directed to a photodetector that produces electrical signal data proportional to the intensity of the received light. The electrical signal data is processed to detect the presence of an optical code and to recover the information encoded on the optical code.

Figure 2:
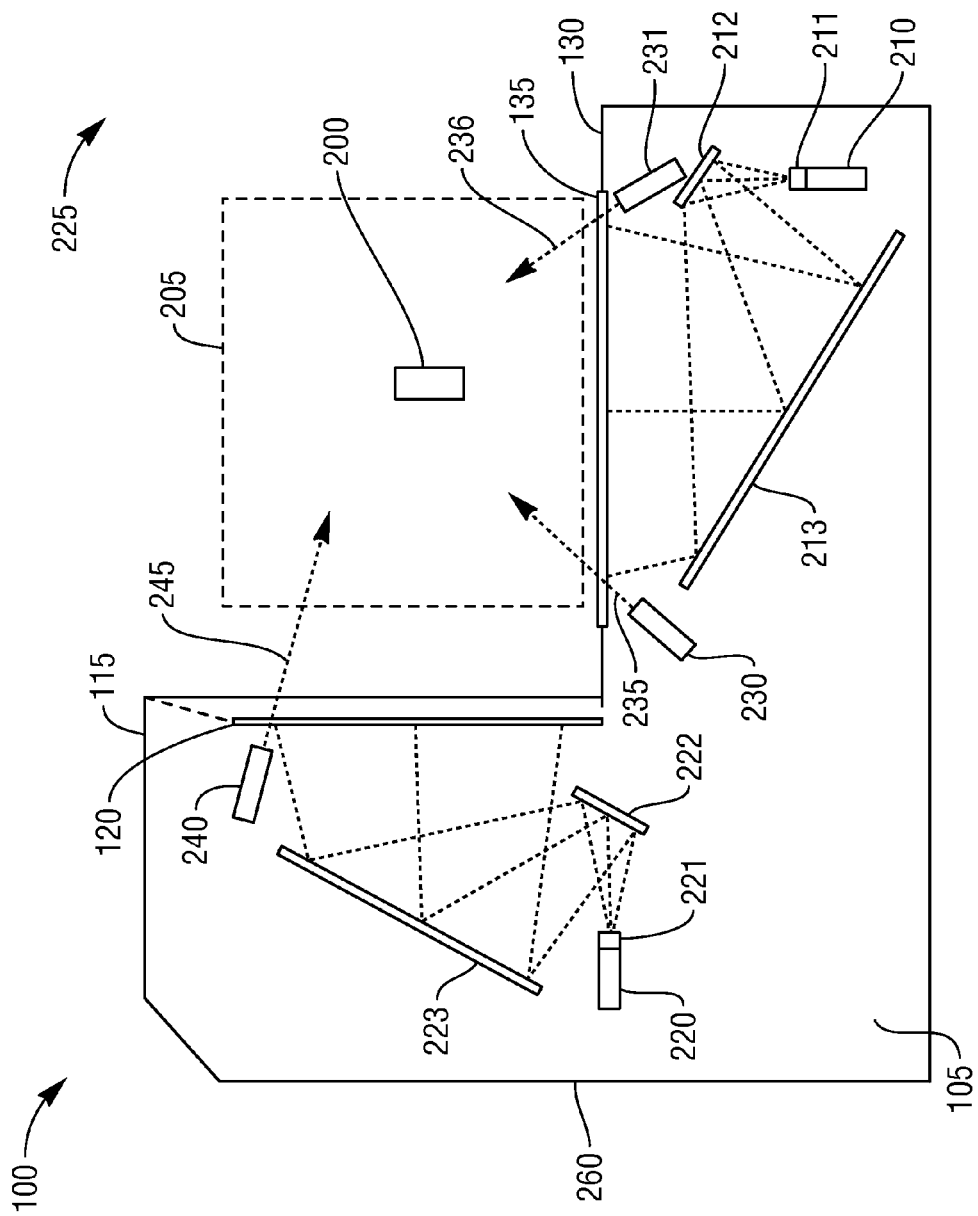
FIG. 2 is a high-level cross-sectional drawing illustrating the optical code scanner.

Referring now to FIG. 2, there is provided a high-level cross-sectional drawing further illustrating the exemplar embodiment of the optical code scanner 100. The scanner 100 includes a first image capture device 210 and a second image capture device 220. The first image capture device 210 includes a first optical assembly 211 that focuses light directed at the first image capture device 210 onto the first image capture device 210. The second image capture device 220 also includes a second optical assembly 221 that focuses light directed at the second image capture device 220. Additional details regarding the components and the function of the first and second optical assemblies 211, 221 are provided in FIG. 4.

The first image capture device 210 captures images (dashed lines) that pass through the horizontal scanning window 135 and are reflected by a first mirror 213 to a second mirror 212 and then through the first optical assembly 211 to the first image capture device 210 where the images are captured as digital images. A first illumination device 230 and a second illumination device 231 are positioned below the horizontal scanning window 135. Each illumination device 230, 231 generates light 235, 236 that passes through the horizontal scanning window 135 and illuminates an object 200 located in an object scanning area 205. The object scanning area 205 is located above the horizontal scanning window 135 and in front of the vertical scanning window 120. The scanner 100 is designed so that optical codes located within the object scanning area 205 can be read by processing captured images of the optical codes. The object 200 includes an optical code that is read by the scanner 100.

The second image capture device 220 captures images (dashed lines) that pass through the vertical scanning window 120 and are reflected by a third mirror 223 to a forth mirror 222 and then through the second optical assembly 221 to the second image capture device 220 where they are captured as digital images. A third illumination device 240 is positioned behind the vertical scanning window 120. The third illumination device 240 generates light 245 that passes through the vertical scanning window 120 and also illuminates the object 200 located in the object scanning area 205.

Each of the illuminations devices 230, 231, 240 may suitably include a separate red, green and blue light emitting diode (LED). Each of the LEDs can be controlled separately to create a wide range of colors. In some embodiments, the three LEDs are combined into a single LED that can produce red, green and blue light. When just the red LED is turned on, a narrow band of red light is emitted where the wavelength is in the range of 620-645 nanometers. When just the green LED is turned on, a narrow band of green light is emitted where the wavelength is in the range of 520-550 nanometers. When just the blue LED is turned on, a narrow band of blue light is emitted where the wavelength is in the range of 460-490 nanometers. The present invention will still function if the light emitted by an LED is slightly outside of these ranges.

Figure 3:
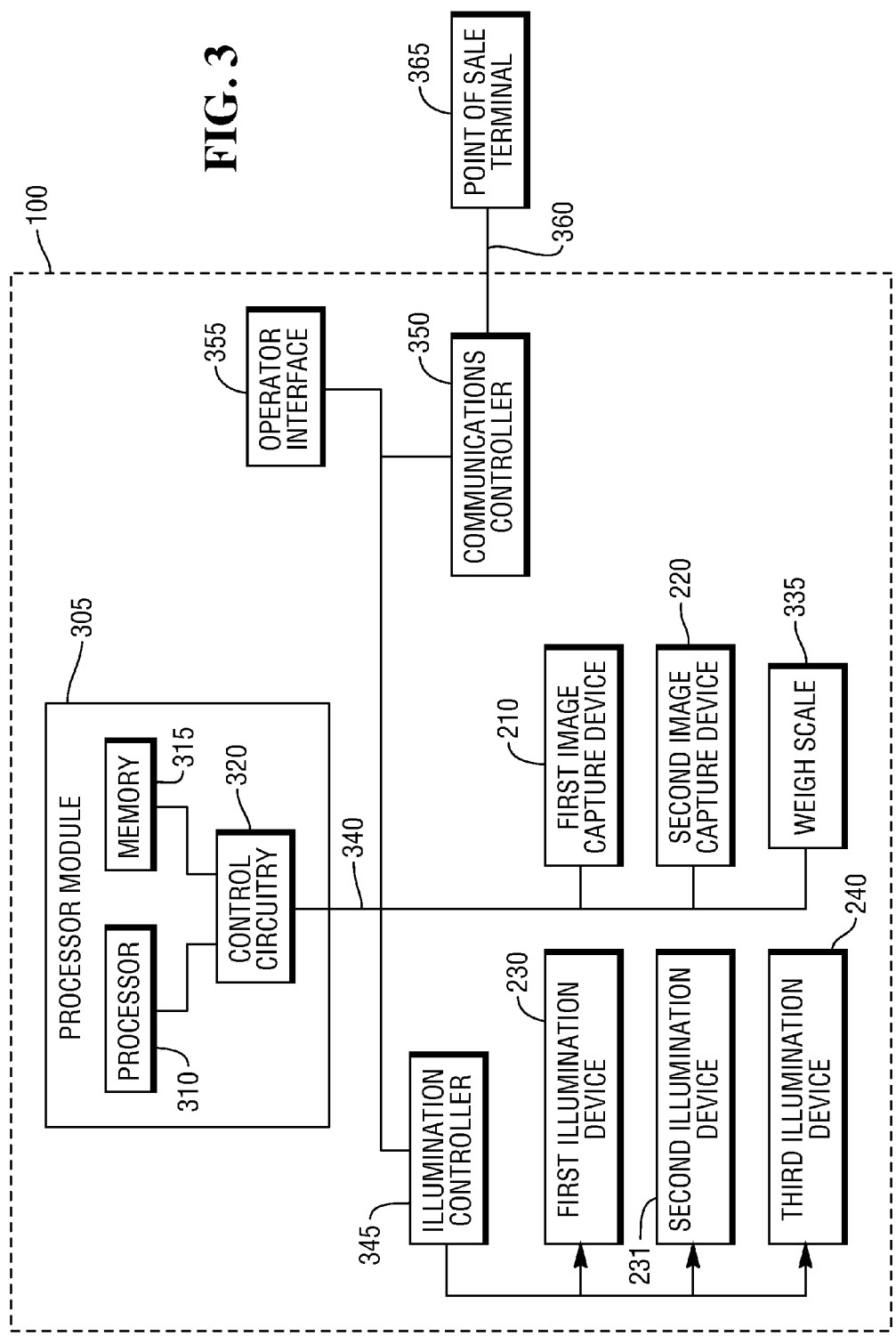
FIG. 3 is a high-level block diagram illustrating selected hardware components of the optical code scanner.

In other embodiments, there are more than three illumination devices and they are positioned around the scanning windows 135, 120. Some may suitably be located within the housing 105 such that they transmit light through an opening in the housing 105 other than through one of the scanning windows 135, 120. Further, each of the illumination devices 230, 231, 240 may suitably include multiple illumination devices that are aimed in slightly different directions to illuminate a wider area. Each of the illumination devices 230, 231, 240 are controlled by a processor 310 (FIG. 3).

In still other embodiments, each scanning window 135, 120 has more than a single image capture device. The additional image capture device or devices capture images from different areas of the object scanning area 205.

In some embodiments, the horizontal scanning window 135 is incorporated in a weigh plate (not shown) that is attached to a weigh scale 335 (FIG. 3) which determines the weight of objects placed on the weigh plate or the horizontal scanning window 135.

The two image capture devices 210, 220 preferably may be implemented using image sensors 425 (FIG. 4) that are based on complementary metal oxide semiconductor (CMOS) technology. In some embodiments, other types of image sensor technology is used such as charged-coupled device (CCD) technology. Each of the image capture devices 210, 220 captures an electronic image of an optical image directed to the device. The electronic image is captured in the form of digital image data that represents the intensity of light received by each pixel of each image capture device 210, 220.

With reference to FIG. 3, there is provided a high-level block diagram illustrating an exemplar embodiment of certain hardware components of the scanner 100. The scanner 100 includes a processor module 305 that includes a processor 310, a memory 315, and control circuitry 320. The memory 315 is non-transitory and computer readable. The memory 315 includes both volatile and non-volatile memory. The non-volatile memory may suitably include solid state and/or rotating memory devices. The processor 310 executes computer instruction stored in the memory 315 which when executed by the processor 310 cause the processor 310 to control the components of the scanner 100 and to implement the features and functions of the scanner 100.

The control circuitry 320 includes hardware interfaces between the processor 310 and the memory 315 and between the processor 310 and a bus 340 used to communicate with other components of the scanner 100. The scanner 100 further includes an illumination controller 345, an operator interface 355 and a communications controller 350. The bus 340 connects the processor 310 to the first image capture device 210, the second image capture device 220, the weigh scale 245, the operator interface 355 and the communications controller 350 such that the processor 310 can communicate with and control each of them.

The illumination controller 345 controls the three illumination devices 230, 231, 240. The processor 310 causes the illumination controller 345 to control each of the illumination devices 230, 231, 240. Controlling the illumination devices 230, 231, 240 includes turning the illumination devices 230, 231, 240 on or off, setting the color of light that is generated and setting the output power. The illumination devices 230, 231, 240 are turned on for short periods of time and during each period they are instructed to generate one color of light. The illumination devices 230, 231, 240 can generate a large number of light colors. This will be discussed in more detail in connection with the discussion of FIG. 5.

The communications controller 350 includes the hardware and software required for the scanner 100 to connect to and communicate over the network connection 360 to a point of sale terminal 365. In some embodiments, the network connection 360 is implemented as a universal system bus (USB). In other embodiments, the network connection 360 is implemented as an RS-232 interface. In other embodiments, the scanner 100 communicates over the network connection 360 to different types of apparatuses or systems.

The operator interface 355 includes input devices, such as buttons and an output device such as one or more LEDs associated with the different functions and a speaker that produces audible sounds associated with different functions all of which are used to communicate information to the operator.

Figure 4:
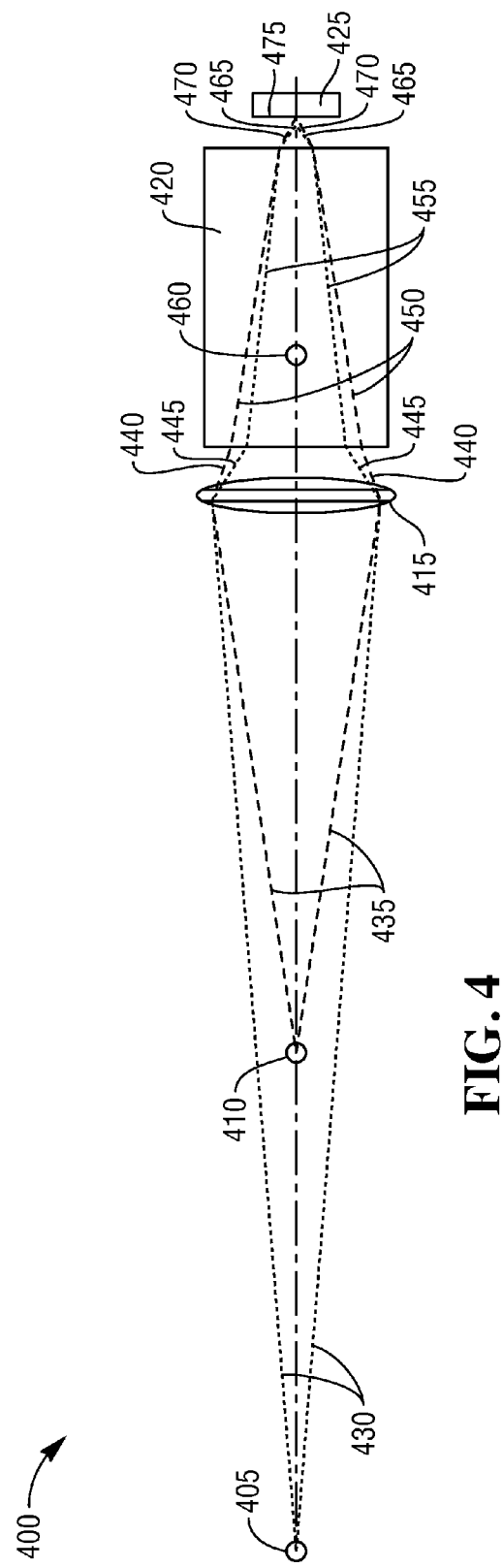
FIG. 4 is a high-level diagram of an optical system used by each of the image capture devices in the optical code scanner.

FIG. 4 is high-level diagram of an optical system 400 which may be suitably used by each of the image capture devices 210, 220. It should be noted that the elements of FIG. 4 are not drawn to scale. The optical system 400 includes the image sensor 425, a high dispersion optical lens 420 and a standard color corrected optical lens assembly 415. All of the optical elements of the optical system 400 are in fixed locations and do not include components that are moved during normal operation to focus an image. The optical elements may include movable parts but they are only moved or adjusted during the manufacture or repair of the optical system 400. The optical elements are centered about and perpendicular to an optical axis 460. The image sensor 425 is preferably implemented using CMOS technology. However, other imaging technologies can be used. By using different colors of light, the optical system 400 focuses images from different locations to the active surface 475 of the image sensor 425. The image sensor 425 converts the received light image to electronic digital data that can be read and processed by the computer 310. Not all colors of light will result in an image being properly focused on the image sensor 425 but at least one color of light will cause the image to be properly focused on the image sensor 425.

The optical lens assembly 415 includes one or more fixed standard optical lenses that focus incoming image data through the high dispersion optical lens 420 onto the surface 475 of the image sensor 425. Preferably the optical lens assembly 415 is a compound lens that is color corrected to reduce or eliminate chromatic aberration. The optical lens assembly 415 may suitably include a fixed aperture to control the amount of light that passes through the lens assembly 415. The fixed aperture is generally set to an f-stop value of approximately F/2 which provides a relatively large opening for light transmission.

The high dispersion optical lens 420 is made of a high dispersion optical material such as but not limited to Schott SF66 or Ohara SNPH2 glass. Lenses made of high dispersion material exhibit a high degree of chromatic aberration that is not corrected. Standard lenses that are color corrected will compensate for chromatic aberration. Chromatic aberration is a type of optical distortion in which different colors or wavelengths of light are focused to different points by a lens. A lens made of a high dispersion material has a different refractive index for different wavelengths of light which cause the different wavelengths of light to be focused to different points. In general, the refractive index decreases with increasing wavelengths. This means that the refractive index is higher for blue light than for red light.

The high dispersion optical lens 420 is a cylinder shape where the two ends of the cylinder are parallel to each other and polished to optical standards. The ends of the cylinder are coated with an anti-reflective (AR) optical material that reduces light reflections and improves efficiency of the optical system 400. In this embodiment, the cylinder is approximately 11 mm in length with a diameter of approximately 8 mm. Other embodiments use a high dispersion optical lens 420 that differs in shape or dimensions but still exhibits the same benefit as the high dispersion optical lens 420.

The depth of field of the optical system 400 is expanded by using different wavelengths of light to illuminate an object as different images of the object are captured. Because of the chromatic aberration characteristic of the high dispersion lens 420, images of objects in different locations can be accurately focused onto the surface 475 of the image sensor 425 with no movement of the lens 415 by changing the wavelength of the light used to illuminate the objects. Wavelengths of red light are used to focus objects in a near field 410. Wavelengths of blue light are used to focus objects in a far field 405. Wavelengths of green light are used to focus objects that are located between the near field 410 and the far field 405. The processor 310 causes the three illumination devices 230, 231, 240 to generate the different wavelengths of light. Because the actual location of an object to be scanned is not known prior to scanning, the processor 310 will capture a sequence of three images where a different wavelength of light is used to illuminate the object in each image. A red, green and blue light is used to capture the three images. The color of light that causes the object to be in focus or to have a focal point at the surface 475 of the image sensor 425, also determines the general location of the object. That is the color of light determines whether the object is located in the near, middle or far fields.

The illumination devices 230, 231, 240 are located such that the light they generate represents the majority of light reflected back from an object presented for capture. This arrangement maximizes the effects due to the chromatic aberration characteristic of the high dispersion lens 420 and produces the maximum depth of field for the optical system 400. The illumination devices 230, 231, 240 have a low duty cycle meaning they are turned off more than half the time. Also, because the different colors of light are generated for short periods of time and occur back to back, the human eye generally sees a white light of medium to low intensity.

In some embodiments, more than three colors of light are used to illuminate the object 200. In some embodiments, non-visible light is used to illuminate the object 200 such as infrared light. Most standard CMOS image sensors are able to capture infrared light and the use of infrared light extends the depth of field farther than using just visible light.

FIG. 4 further depicts two image paths. One image path is for an object located in the near field 410 and a second image path is for an object located in the far field 405. An object located in the near field 410 is best viewed when illuminated using red light. The image paths for the near field 410 object are defined by paths 435 until they pass through the optical lens assembly 415 and are then defined by paths 440 until they enter the high dispersion lens 420. Paths 450 define the paths as they pass through the high dispersion lens 420 and paths 465 define the paths until they impinge on the surface 475 of the image sensor 425.

An object located in the far field 405 is best viewed when illuminated using blue light. The image paths for an object in the far field 405 are defined by paths 430 until it passes through the optical lens assembly 415 and are defined by paths 445 until they enter the high dispersion lens 420. Paths 455 define the paths as they pass through the high dispersion lens 420 and paths 470 define the paths until they impinge on the surface 475 of the image sensor 425.

Figure 5:
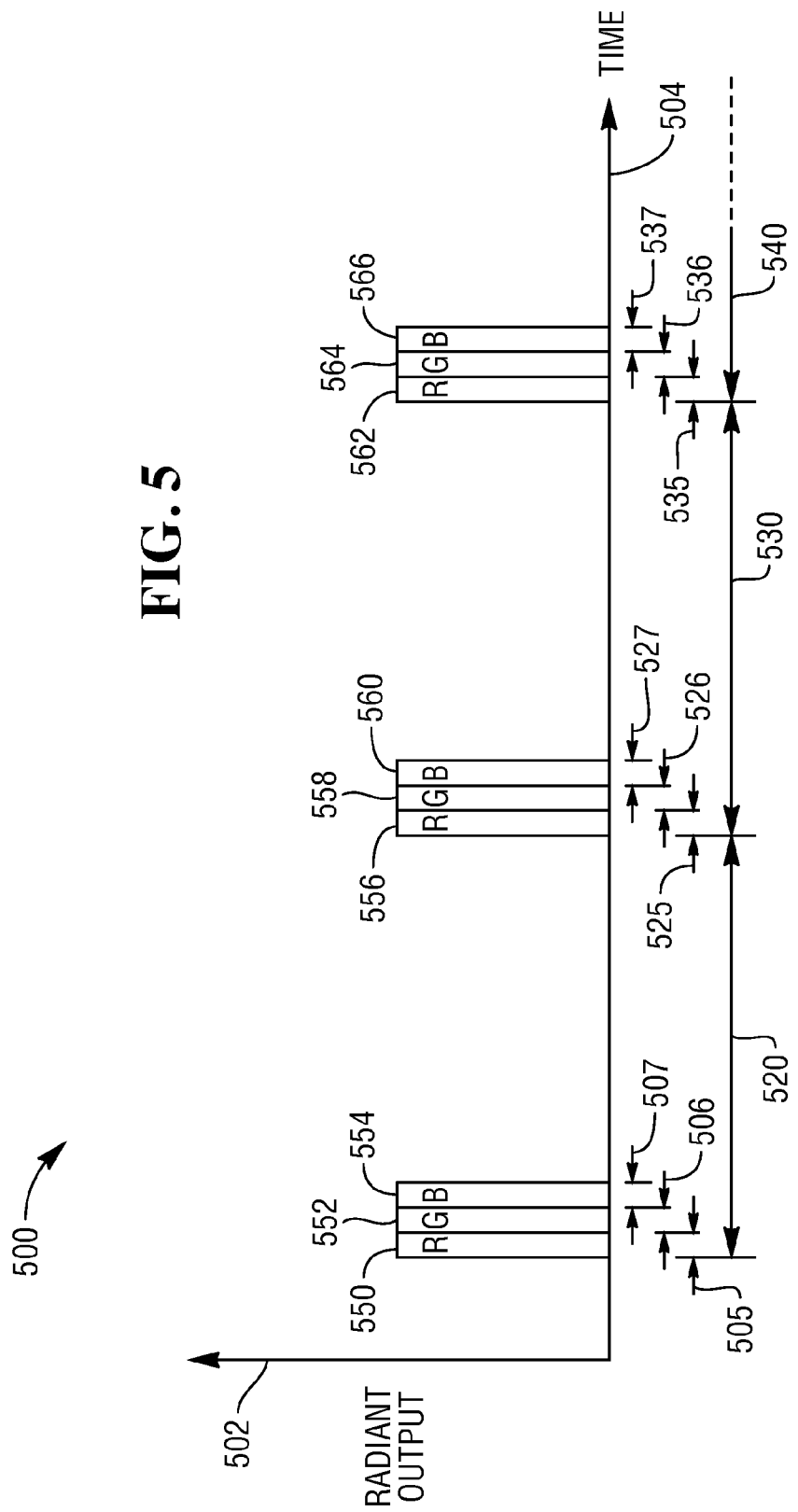
FIG. 5 is a chart illustrating the color and timing of light emitted by the illumination devices during image capture cycles of the optical code scanner.

With reference to FIG. 5, there is provided a chart 500 illustrating the color and timing of light emitted by the illumination devices 230, 231, 240 during three image capture cycles 520, 530, 540. The emitted light is used to capture images of objects located in the field of view of the optical system 400. The vertical axis 502 of the chart 500 is the radiant output of the illumination devices 230, 231, 240. The horizontal axis 504 of the chart 500 represents time. Generally, the illumination devices 230, 231, 240 are operated at full output power. The illumination devices 230, 231, 240 are operated during the first image capture cycle 520 which includes three light pulses 550, 552, 554 where, for each light pulse, the illumination devices 230, 231, 240 generate a different color of light. Each of the three light pulses 550, 552, 554 have a duration of 100 microseconds 505, 506, 507 and the image capture cycle is repeated every 11.5 milliseconds 520. An image of the object is captured during each of the light pulses 550, 552, 554.

The illumination devices 230, 231, 240 generate a red light during the first light pulse 550. The illumination devices 230, 231, 240 generate a green light during the second light pulse 552. The illumination devices 230, 231, 240 generate a blue light during the third light pulse 554. Other embodiments will have a different order for generating the colors. The image capture cycle 520 is continuously repeated while the scanner 100 is operating. The scanner 100 may stop the illumination cycles when it is not actively scanning objects to save power. The scanner 100 will restart the image capture cycles 520 when scanning resumes.

The other two illumination cycles 530, 540 depicted in FIG. 5 have the same characteristics and times as the first illumination cycle 520. The second illumination cycle 530 has three light pulses 556, 558, 560 and each of the light pulses has a duration of 100 microseconds 525, 526, 527. The third illumination cycle 540 has three light pulses 562, 564, 566 and each of the light pulses has a duration of 100 microseconds 535, 536, 537.

Chart 1 below lists the focal planes for the optical system 400 using the high dispersion lens 420 and where blue, green and red colored light is used to capture images. When red colored light is used to capture an image, the focal plane is 8.3 inches from the optical lens assembly 415 which is the shortest length. When green colored light is used to capture an image, the focal plane is 10.5 inches from the optical lens assembly 415 and when blue colored light is used to capture an image, the focal plane is 14.5 inches from the optical lens assembly 415 which is the longest length. The depth of field (DOF) for the optical system 400 is the distance over which an object captured in an image has sufficient clarity to identify the object or an optical code on the object so that it can be read. Experiments show the depth of field for the optical system 400 without the high dispersion lens 420 is approximately 1.6 inches. However, using the high dispersion lens 420 increases the depth of field from 1.6 inches to 6.2 inches which is more than a 300% improvement.

CHART 1

| DEPTH OF FIELD USING HIGH DISPERSION LENS | |
| --- | --- |
| Light Color | FOCAL PLANE (INCHES) |
| Blue | 14.5" |
| Green | 10.5" |
| Red | 8.3" |

DEPTH OF FIELD: 14.5"-8.3" = 6.2 IN

Figure 6:
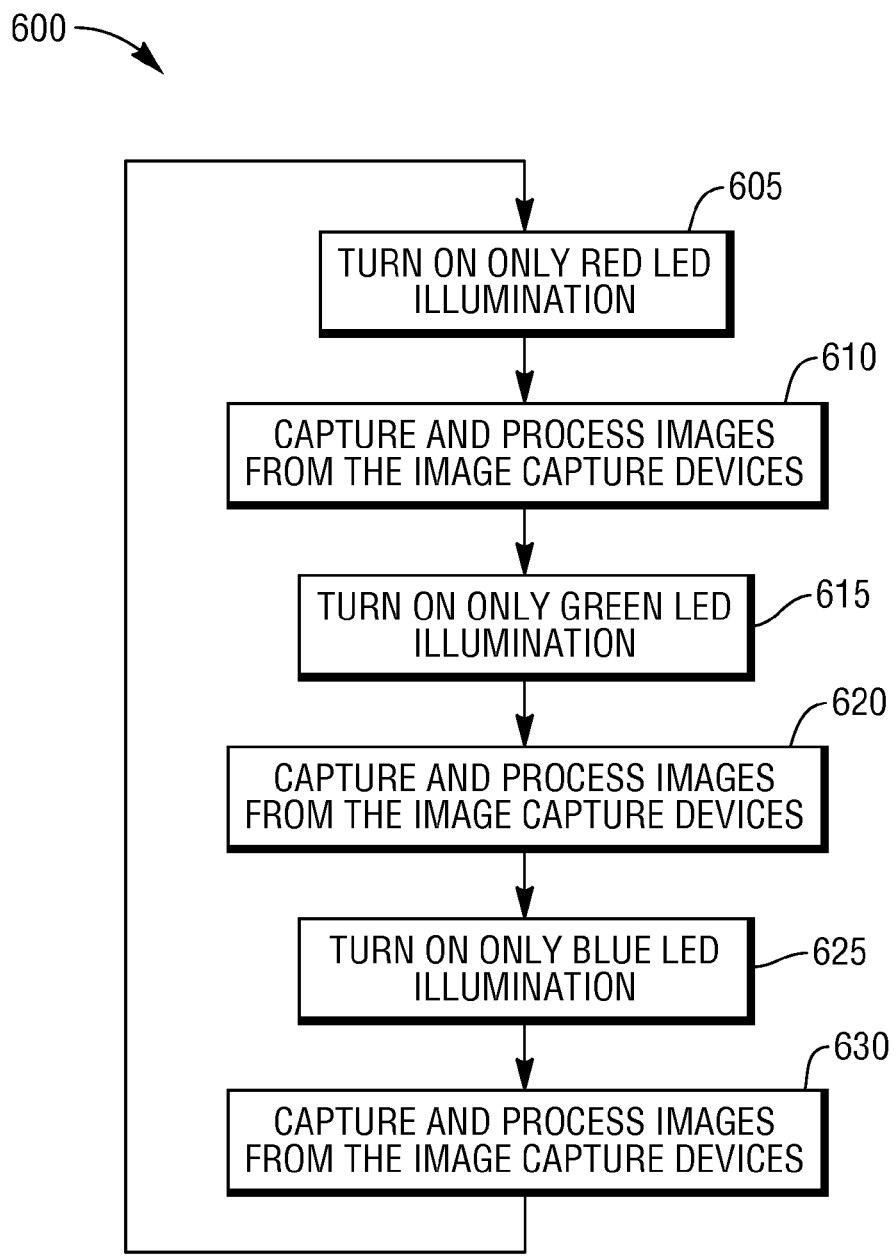
FIG. 6 is a high-level flow diagram illustrating a method of operating the optical code scanner.

In FIG. 6, there is provided a high-level flow diagram illustrating a method 500 of operating the optical code scanner 100. The following method describes one embodiment of the optical code scanner 100 and one example method for operating the optical code scanner 100 to increase the depth of field when reading an optical code. The steps are performed during a single 11.5 millisecond image capture cycle 520 but the steps are continuously repeated. The method described below is performed by the processor 310 in the optical code scanner 100.

In step 605, the processor 310 starts the image capture cycle 520 by causing the illumination devices 230, 231, 240 to turn on and to generate a red colored light. The red light passes through the horizontal and vertical scanning windows 135, 120 and illuminates the object 200 in the object scanning area 205. The processor 310 causes the illumination devices 230, 231, 240 to generate the red colored light for 100 microseconds 505 as shown in FIG. 5. As shown in chart 1, red colored light has the shortest distance to the focal plane.

In step 610, the processor 310 causes the first and second image capture devices 210, 220 to each capture an image during the 100 microseconds 505 when the red colored light is being generated by the illumination devices 230, 231, 240.

The processor 310 then processes the captured images to identify and read any optical code or codes that may be visible in the images. The red colored light has the shortest distance to the focal plane so if optical codes are read from these images, it means the optical code or codes were located closer to the image capture devices 210, 220 or in an area approximately 8.3 inches from the image capture devices 210, 220.

In step 615, the processor 310 causes the illumination devices 230, 231, 240 to generate a green colored light. The green light passes through the horizontal and vertical scanning windows 135, 120 and illuminates the object 200 in the object scanning area 205. The processor 310 causes the illumination devices 230, 231, 240 to generate the green colored light for 100 microseconds 506 as shown in FIG. 5. As shown in chart 1, green colored light has an intermediate distance to the focal plane.

In step 620, the processor 310 causes the first and second image capture devices 210, 220 to each capture an image during the 100 microseconds 506 when the green colored light is being generated by the illumination devices 230, 231, 240. The processor 310 then processes the captured images to identify and read any optical code or codes that may be visible in the images. The green colored light has the medium focal plane location so if optical codes are read from these images, it means the optical code or codes were located in an area approximately 10.5 inches from the image capture devices 210, 220.

In step 625, the processor 310 causes the illumination devices 230, 231, 240 to generate a blue colored light. The blue light passes through the horizontal and vertical scanning windows 135, 120 and illuminates the object 200 in the object scanning area 205. The processor 310 causes the illumination devices 230, 231, 240 to generate the blue colored light for 100 microseconds 507 as shown in FIG. 5. As shown in chart 1, blue colored light has a farthest distance to the focal plane.

In step 630, the processor 310 causes the first and second image capture devices 210, 220 to each capture an image during the 100 microseconds 507 when the blue colored light is being generated by the illumination devices 230, 231, 240. The processor 310 then processes the captured images to identify and read any optical code or codes that may be visible in the images. The blue colored light has the maximum focal plane distance so if optical codes are read from these images, it means the optical code or codes were located in an area approximately 14.5 inches from the image capture devices 210, 220. After the images are captured, the processor 310 turns off the illumination devices 230, 231, 240 for the remainder of the 11.5 millisecond image capture cycle 520. Once the image capture cycle 520 is complete, control passes back to step 605.

In some embodiments, the processor 310 determines the approximate location of the optical code 205 based on which image capture device captured the image used to decode the optical code 205 and the color of light that was being generated when the image was captured. In some embodiments, an infrared color is used as a fourth color or as a substitute for the red color. The infrared color has a shorter distance to the focal plane than the red colored light.

Although the present invention has been described with particular reference to certain preferred embodiments thereof, variations and modifications of the present invention can be effected within the spirit and scope of the following claims.

What is claimed is:

1. A method of operating an optical code scanner to increase the depth of field for reading optical codes without moving optical elements, the method implemented by a digital processor within the optical code scanner, the method comprising:

causing a plurality of illumination devices to emit a first narrow band of light directed to a scanning area of the optical code scanner for a first time period;

capturing an image of the scanning area during the first time period wherein the image passes through a high dispersion optical lens before being captured;

causing a plurality of illumination devices to emit a second narrow band of light directed to the scanning area of the optical code scanner for a second time period wherein the second narrow band of light is at a wavelength different from the first narrow band of light;

capturing an image of the scanning area during the second time period wherein the image passes through the high dispersion optical lens before being captured;

processing the captured images to decode an optical code;

causing a plurality of illumination devices to emit a third narrow band of light directed to the scanning area of the optical code scanner for a third time period wherein the third narrow band of light is at a wavelength different from the first and second narrow band of light; and capturing an image of the scanning area during the third time period wherein the image passes through the high dispersion optical lens before being captured.

2. The method of claim 1, wherein the third narrow band of light is green light.

3. The method of claim 1, wherein the first narrow band of light is red light.

4. The method of claim 1, wherein the first narrow band of light is infrared light.

5. The method of claim 1, wherein the second band of light is blue light.

6. A method of operating an optical code scanner that increases the depth of field for the scanner when reading optical codes without moving optical elements, the method implemented by a digital processor within the optical code scanner, the method comprising:

generating a first narrow band of light directed to a scanning area of the optical code scanner for a first time period;

capturing an image during the first time period wherein light passes through a high dispersion optical lens that correctly focuses only light reflected from a first portion of the depth of field when illuminated by light of the first narrow band of light;

generating a second narrow band of light directed to the scanning area of the optical code scanner for a second time period;

capturing an image during the second time period wherein light passes through a high dispersion optical lens that correctly focuses only light reflected from a second portion of the depth of field when illuminated by light of the second narrow band of light wherein the first and second portions of the depth of field do not overlap and first narrow band of light is different from the second narrow band of light;

processing the captured images to decode an optical code;

generating a third narrow band of light directed to the scanning area of the optical code scanner for a third time period;

capturing an image during the third time period wherein light passes through a high dispersion optical lens that correctly focuses only light reflected from a third portion of the depth of field when illuminated by light of the third narrow band of light wherein the first, second and third portions of the depth of field do not overlap and third narrow band of light is different from the first and second narrow band of light.

7. The method of claim 6, wherein the third narrow band of light is green light.

8. The method of claim 6, wherein the first narrow band of light is red light.

9. The method of claim 6, wherein the first narrow band of light is infrared light.

10. The method of claim 6, wherein the second band of light is blue light.

11. An optical code scanner with an enhanced depth of field using fixed optical elements, the optical code scanner comprising:

at least one illumination device that emits at least a first narrow band of light during a first period of time and emits a different second narrow band of light during a second period of time and where the illumination device is aligned to direct the emitted light to an optical code scanning area;

an image capture device aligned to receive light reflected from the optical code scanning area; and a fixed first optical focusing lens that focuses the received reflected light to a focal point on the image capture device where the fixed optical lens focuses light from a first portion of the enhanced depth of field to the focal point during the first period of time and focuses light from a different second portion of the enhanced depth of field to the focal point during the second period of time, where the first optical focusing lens is made of a high dispersion material.

12. The optical code scanner of claim 11, where the first optical focusing lens is in the shape of a cylinder with optically polished flat parallel ends.

13. The optical code scanner of claim 11, where the first narrow band of light is red light.

14. The optical code scanner of claim 11, where the second narrow band of light is blue light.

15. An optical code scanner with an enhanced depth of field using fixed optical elements, the optical code scanner comprising:

at least one illumination device that emits at least a first narrow band of light during a first period of time and emits a different second narrow band of light during a second period of time and where the illumination device is aligned to direct the emitted light to an optical code scanning area;

an image capture device aligned to receive light reflected from the optical code scanning area;

a fixed first optical focusing lens that focuses the received reflected light to a focal point on the image capture device where the fixed optical lens focuses light from a first portion of the enhanced depth of field to the focal point during the first period of time and focuses light from a different second portion of the enhanced depth of field to the focal point during the second period of time; and a fixed second optical focusing lens where the lens is color corrected.

16. An optical code scanner with an enhanced depth of field using fixed optical elements, the optical code scanner comprising:

at least one illumination device that emits at least a first narrow band of light during a first period of time and emits a different second narrow band of light during a second period of time and where the illumination device is aligned to direct the emitted light to an optical code scanning area;

an image capture device aligned to receive light reflected from the optical code scanning area; and a fixed first optical focusing lens that focuses the received reflected light to a focal point on the image capture device where the fixed optical lens focuses light from a first portion of the enhanced depth of field to the focal point during the first period of time and focuses light from a different second portion of the enhanced depth of field to the focal point during the second period of time, wherein:

the at least one illumination device further emits a third narrow band of light during a third period of time; and the fixed first optical focusing lens focuses light from a third portion of the enhanced depth of field to the focal point during the third period of time.

17. The optical code scanner of claim 15, where the second optical focusing lens is disposed to receive light reflected from the optical code scanning area and transmit focused light to the first optical focusing lens.

* * * * *